May 2, 1961  D. JAWOLL  2,981,992
SNAP FASTENER WITH PINS FOR TROUSER CUFFS AND THE LIKE
Filed Sept. 3, 1959
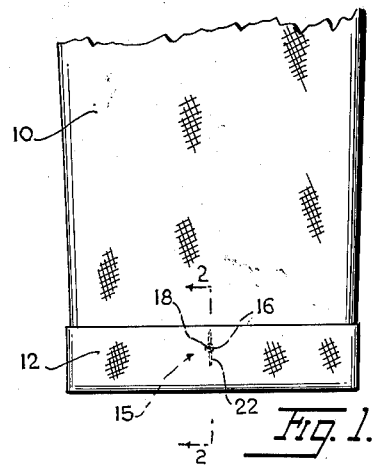
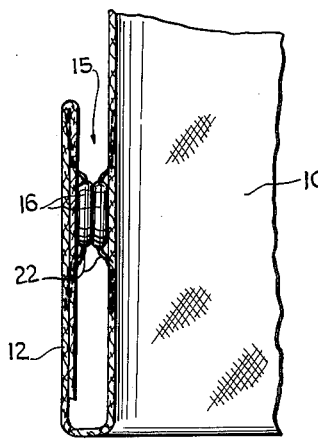
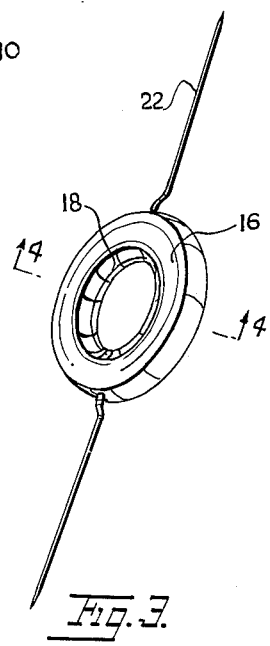
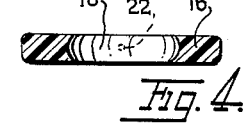
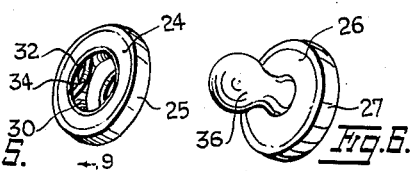
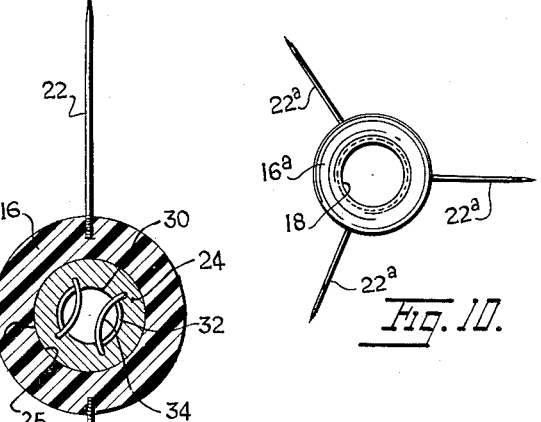
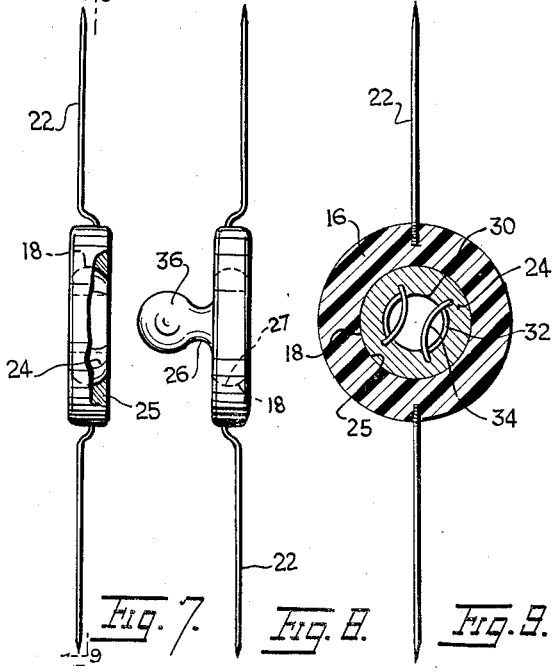
INVENTOR.
DAN JAWOLL
BY Zoltan Pollack
ATTORNEY

United States Patent Office 2,981,992
Patented May 2, 1961

2,981,992
SNAP FASTENER WITH PINS FOR TROUSER CUFFS AND THE LIKE
Daniel Jawoll, 660 Willoughby Ave., Brooklyn, N.Y.
Filed Sept. 3, 1959, Ser. No. 837,796
2 Claims. (Cl. 24—73)

This invention relates to the art of garment fasteners and more particularly concerns snap fasteners adapted for detachably securing cuffs, collars and the like to the bodies of garments.

A particular need has heretofore existed for a fastener means which may be quickly attached and removed from a part of a garment, the fastener having quick detachable parts so the cuff, collar, pocket or other portion secured by the fastener may be readily opened for cleaning or for general access.

According to the invention there is provided an annular fastener body having radially extending flexible pins for removably securing the body to a garment, the annular body being adapted to receive male or female parts of a snap fastener. Two such bodies respectively attached to different parts of a garment will receive and retain male and female snap fastener parts. The snap fastener parts when engaged will hold the parts of the garment together.

It is therefore a principal object of the invention to provide a snap fastener support in the form of an annular body having radially extending flexible pins.

A further object is to provide a snap fastener support in the form of a flexible annular body having radially extending pins for attaching the body to a garment.

A still further object is to provide a snap fastener including a male or female member removably secured in a flexible annular body having radially extending flexible pins.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a trousers leg having a fastener thereon embodying the invention.

Fig. 2 is a sectional view on an enlarged scale taken on line 2—2 of Fig. 1.

Fig. 3 is a perspective view of the annular body of the snap fastener support.

Fig. 4 is a sectional view taken on line 4—4 of Fig. 3.

Fig. 5 and Fig. 6 are perspective views of modified female and male snap fastener members, respectively.

Fig. 7 and Fig. 8 are side elevational views of two modified fastener bodies carrying female and male snap fastener members.

Fig. 9 is a sectional view taken on line 9—9 of Fig. 7.

Fig. 10 is a plan view of another fastener body according to the invention.

Referring to the drawings, there is shown in Figs. 1 and 2 a trousers leg 10 having a cuff 12 detachably secured by one or more fasteners generally indicated by numeral 15. Each of the fasteners includes a pair of annular bodies 16 as best shown in Figs. 3, 4, 7 and 9. The body 16 is preferably formed as an annular ring of flexible plastic material having a central hole 18 formed with a concave wall. Secured in the outer periphery of the body 16 are two or more flexible metal spring pins 22. These pins extend radially outward and are adapted to be engaged in the fabric of the body of the garment 10 and any other part to be attached thereto such as cuff 12. Since both the ring body 16 and the pins 22 are flexible, no difficulty is experienced in insertion of the pins into the fabric to hold the body 16. The resiliency or springiness of the pins holds them securely in place.

The body 16 is adapted to receive a disk-like female snap fastener member 24 or disk-like male fastener member 26 as shown in Figs. 5, 7 and 6, 8, respectively. The member 24 has an opening 30 formed with lateral recesses 32 adapted to receive spring elements 34 secured at the edges of the opening in the member 24; see Figs. 5 and 9. The snap fastener members preferably have convex outer surfaces 25, 27 adapted to be securely but removably held in the concave wall of hole 18. Spring elements 34 engage the head 36 of member 26 when the members 24, 26 are engaged as indicated in Fig. 2.

The pins 22 permit two annular bodies 16 to be attached to parts of a garment to be removably secured together. The male and female members will then be inserted into the flexible bodies 16 and then the members 24, 26 may be detachably engaged. No stitching of parts as has heretofore been required for snap fastener members, is necessary.

Fig. 10 shows another fastener body 16ᵃ which has three radially extending pins 22ᵃ. If desired, more than three pins may be inserted into the annular body before, during or after the molding of the body is completed. By employing a plurality of pins a more secure attachment to the garment parts is effected.

The annular body and radial pins as well as members 24, 26 can be fabricated by mass production methods at low cost.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A fastener assembly comprising a pair of annular bodies, each of said bodies having a plurality of flexible pins extending radially therefrom for engagement of the body in a fabric part of a garment, each body having a central aperture, and a disk-like snap fastener device removably seated in the aperture, one of the devices having a spherical snap fastener element and the other device having spaced curved spring snap fastener elements detachably engaged with the spherical snap fastener element.

2. A fastener assembly comprising a pair of annular bodies, each of said bodies having a plurality of flexible pins extending radially therefrom for engagement of the body in a fabric part of a garment, each body having a central aperture, and a disk-like snap fastener member removably seated in the aperture, one of the members being a male snap fastener member element and the other member being a female snap fastener member detachably engaged with the male snap fastener member, each of the bodies being formed of flexible material for removably holding the snap fastener member in the aperture in the body.

References Cited in the file of this patent

UNITED STATES PATENTS

| | | |
|---|---|---|
| 908,745 | Clark | Jan. 5, 1909 |
| 1,380,257 | Schlote | May 31, 1921 |
| 1,750,588 | Gilmore | Mar. 11, 1930 |
| 1,861,117 | Fenton | May 31, 1932 |

FOREIGN PATENTS

| | | |
|---|---|---|
| 788,742 | Great Britain | Jan. 8, 1958 |